(12) United States Patent
Nishiguchi

(10) Patent No.: US 8,994,993 B2
(45) Date of Patent: Mar. 31, 2015

(54) MANAGEMENT SYSTEM, MANAGEMENT SERVER, AND RECORDING MEDIUM

(71) Applicant: Tomohiro Nishiguchi, Nishinomiya (JP)

(72) Inventor: Tomohiro Nishiguchi, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 36 days.

(21) Appl. No.: 13/743,034

(22) Filed: Jan. 16, 2013

(65) Prior Publication Data
US 2013/0194627 A1 Aug. 1, 2013

(30) Foreign Application Priority Data

Jan. 30, 2012 (JP) .................................. 2012-016342

(51) Int. Cl.
*G06F 3/12* (2006.01)
*G08B 5/22* (2006.01)
*H04N 1/00* (2006.01)

(52) U.S. Cl.
CPC .......... *G06F 3/1293* (2013.01); *H04N 1/00408* (2013.01)
USPC ........................... 358/1.15; 358/1.1; 340/7.24

(58) Field of Classification Search
None
See application file for complete search history.

(56) References Cited

U.S. PATENT DOCUMENTS 8,299,897 B2 * 10/2012 Tokashiki et al. ............ 340/7.24
2006/0050291 A1    3/2006 Morikawa et al.
2007/0222797 A1    9/2007 Misawa et al.
2007/0291284 A1 * 12/2007 Kittaka et al. ................. 358/1.1
2013/0057906 A1 *  3/2013 Hosoda ........................ 358/1.15

FOREIGN PATENT DOCUMENTS

| JP | 2006-080855 A | 3/2006 |
| JP | 2007-286569 A | 11/2007 |
| JP | 2010-219879 A | 9/2010 |
| JP | 2011-034160 A | 2/2011 |
| JP | 2011-191892 A | 9/2011 |

OTHER PUBLICATIONS

Office Action (Examiner's Decision to Grant a Patent) issued on Jan. 21, 2014, by the Japanese Patent Office in corresponding Japanese Patent Application No. 2012-016342, and an English Translation of the Office Action. (6 pages).

* cited by examiner

*Primary Examiner* — Fred Guillermety
*Assistant Examiner* — Frantz Bataille
(74) *Attorney, Agent, or Firm* — Buchanana Ingersoll & Rooney PC

(57) ABSTRACT

A management system for managing a management target device includes: a position detection unit configured to detect a position of a user of the management target device; a management server configured to manage Air Tag information relating to the user; and a mobile terminal. The management server includes: a positional information acquisition unit configured to acquire positional information for the position of the user based on a result of the detection by the position detection unit; a generation unit configured to generate the Air Tag information including device-relating information and the positional information of the user; and a transmission unit configured to transmit the Air Tag information to the mobile terminal. The mobile terminal displays an Air Tag image visualizing the device-relating information of the user by superposing the Air Tag image over a portion representing the user within a shot image of scenery around the mobile terminal.

14 Claims, 24 Drawing Sheets

Fig.6

<MANAGEMENT INFORMATION (RELATING TO MFP 10a)>

TB11

| USER ID | ADMINISTRATING USER | USER INSTRUCTING JOB (JOB EXECUTER) |
|---|---|---|
| Sato | ADMINISTRATING USER | --- |
| Suzuki | --- | --- |
| Tanaka | --- | USER INSTRUCTING CURRENTLY EXECUTED JOB (USER CURRENTLY IN USE) |
| Yamada | --- | --- |

Fig. 7

<MANAGEMENT INFORMATION (RELATING TO MFP 10b)>

TB12

| USER ID | ADMINISTRATING USER | USER INSTRUCTING EXECUTED JOB (JOB EXECUTER) |
|---|---|---|
| Sato | — — — | — — — |
| Suzuki | — — — | USER INSTRUCTING CURRENTLY EXECUTED JOB (USER CURRENTLY IN USE) |
| Tanaka | — — — | — — — |
| Yamada | ADMINISTRATING USER | — — — |

| USER ID | POSITION SENSOR ID | POSITIONAL INFORMATION (GPS INFORMATION) (LATITUDE, LONGITUDE, AND ALTITUDE) |
|---|---|---|
| Sato | ID101 | (N1, E1, H1) |
| Suzuki | ID102 | (N2, E2, H2) |
| Tanaka | ID103 | (N3, E3, H3) |
| Yamada | ID104 | (N4, E4, H4) |

| DEVICE ID | STATUS INFORMATION (SUCH AS "NORMAL"/"PAPER OUT"/"PAPER JAM"/"FAILURE") |
|---|---|
| MFP10a | PAPER PROBLEM (SUCH AS PAPER JAM) |
| MFP10b | NORMAL |

| TAG ID | USER ID | POSITION SENSOR ID | POSITIONAL INFORMATION (GPS INFORMATION) (LATITUDE, LONGITUDE, AND ALTITUDE) | AIR TAG DISPLAY | AIR TAG DISPLAY COLOR | AIR TAG CHARACTER STRING |
|---|---|---|---|---|---|---|
| 0001 | Sato | ID101 | (N1, E1, H1) | NOT DISPLAYED | --- | --- |
| 0002 | Suzuki | ID102 | (N2, E2, H2) | NOT DISPLAYED | --- | --- |
| 0003 | Tanaka | ID103 | (N3, E3, H3) | NOT DISPLAYED | --- | --- |
| 0004 | Yamada | ID104 | (N4, E4, H4) | NOT DISPLAYED | --- | --- |

| TAG ID | USER ID | POSITION SENSOR ID | POSITIONAL INFORMATION (GPS INFORMATION) (LATITUDE, LONGITUDE, AND ALTITUDE) | AIR TAG DISPLAY | AIR TAG DISPLAY COLOR | AIR TAG CHARACTER STRING |
|---|---|---|---|---|---|---|
| 0001 | Sato | ID101 | (N1, E1, H1) | DISPLAYED | RED | ADMINISTRATOR OF THE MFP 10a |
| 0002 | Suzuki | ID102 | (N2, E2, H2) | NOT DISPLAYED | --- | --- |
| 0003 | Tanaka | ID103 | (N3, E3, H3) | DISPLAYED | YELLOW | CURRENTLY USING THE MFP 10a TO EXECUTE A JOB. |
| 0004 | Yamada | ID104 | (N4, E4, H4) | NOT DISPLAYED | --- | --- |

| TAG ID | USER ID | POSITION SENSOR ID | POSITIONAL INFORMATION (GPS INFORMATION) (LATITUDE, LONGITUDE, AND ALTITUDE) | AIR TAG DISPLAY | AIR TAG DISPLAY COLOR | AIR TAG CHARACTER STRING |
|---|---|---|---|---|---|---|
| 0001 | Sato | ID101 | (N1, E1, H1) | DISPLAYED | BLUE | ADMINISTRATOR OF THE MFP 10a. |
| 0002 | Suzuki | ID102 | (N2, E2, H2) | DISPLAYED | BLUE | --- |
| 0003 | Tanaka | ID103 | (N3, E3, H3) | DISPLAYED | BLUE | CURRENTLY USING THE MFP 10a TO EXECUTE A JOB. |
| 0004 | Yamada | ID104 | (N4, E4, H4) | DISPLAYED | BLUE | --- |

| TAG ID | USER ID | POSITION SENSOR ID | POSITIONAL INFORMATION (GPS INFORMATION) (LATITUDE, LONGITUDE, AND ALTITUDE) | AIR TAG DISPLAY | AIR TAG DISPLAY COLOR | AIR TAG CHARACTER STRING |
|---|---|---|---|---|---|---|
| 0001 | Sato | ID101 | (N1, E1, H1) | DISPLAYED | RED | ADMINISTRATOR OF THE MFP 10a. |
| 0002 | Suzuki | ID102 | (N2, E2, H2) | DISPLAYED | BLUE | ---- |
| 0003 | Tanaka | ID103 | (N3, E3, H3) | DISPLAYED | YELLOW | CURRENTLY USING THE MFP 10a TO EXECUTE A JOB. |
| 0004 | Yamada | ID104 | (N4, E4, H4) | DISPLAYED | BLUE | ---- |

| TAG ID | USER ID | POSITION SENSOR ID | POSITIONAL INFORMATION (GPS INFORMATION) (LATITUDE, LONGITUDE, AND ALTITUDE) | AIR TAG DISPLAY | AIR TAG DISPLAY COLOR | AIR TAG CHARACTER STRING | PRIORITY |
|---|---|---|---|---|---|---|---|
| 0001 | Sato | ID101 | (N1, E1, H1) | DISPLAYED | RED | ADMINISTRATOR OF THE MFP 10a. | 1 |
| 0002 | Suzuki | ID102 | (N2, E2, H2) | NOT DISPLAYED | --- | --- | --- |
| 0003 | Tanaka | ID103 | (N3, E3, H3) | NOT DISPLAYED | --- | --- | --- |
| 0004 | Yamada | ID104 | (N4, E4, H4) | NOT DISPLAYED | --- | --- | --- |
| 0101 | Sato | ID101 | (N1, E1, H1) | DISPLAYED | YELLOW | CURRENTLY USING THE MFP 10a TO EXECUTE A JOB. | 2 |

| TAG ID | USER ID | POSITION SENSOR ID | POSITIONAL INFORMATION (GPS INFORMATION) (LATITUDE, LONGITUDE, AND ALTITUDE) | IP ADDRESS | AIR TAG DISPLAY | AIR TAG DISPLAY COLOR | AIR TAG CHARACTER STRING |
|---|---|---|---|---|---|---|---|
| 0001 | Sato | ID101 | (N1, E1, H1) | 192.168.1.10 | DISPLAYED | RED | CURRENTLY USING THE HUB 110a. |
| 0002 | Suzuki | ID102 | (N2, E2, H2) | 192.168.1.11 | NOT DISPLAYED | --- | --- |
| ... | | | | | | | |

| USER ID | IP ADDRESS | USER IN USE |
|---|---|---|
| Sato | 192. 168. 1. 10 | O |
| Suzuki | 192. 168. 1. 11 | |

| TAG ID | USER ID | POSITION SENSOR ID | POSITIONAL INFORMATION (GPS INFORMATION) (LATITUDE, LONGITUDE, AND ALTITUDE) | PC IP | AIR TAG DISPLAY | AIR TAG DISPLAY COLOR | AIR TAG CHARACTER STRING |
|---|---|---|---|---|---|---|---|
| 0001 | Sato | ID101 | (N1, E1, H1) | ID_PC1 | DISPLAYED | RED | CURRENTLY USING THE POWER STRIP 210a. |
| 0002 | Suzuki | ID102 | (N2, E2, H2) | ID_PC2 | NOT DISPLAYED | --- | --- |
| ... | | | | | | | |

MANAGEMENT SYSTEM, MANAGEMENT SERVER, AND RECORDING MEDIUM

This application is based on Japanese Patent Application No. 2012-016342 filed on Jan. 30, 2012, the contents of which are hereby incorporated by reference.

BACKGROUND OF THE INVENTION

1. Field of the Invention

The present invention relates to a management system for managing various devices and a technique relating to such a system.

2. Description of the Background Art

Conventionally, in a management system for managing image-forming devices such as MFPs (management target devices), there is a technique for displaying information of a user(s) (such as an administrating user and/or a user in use) of an image-forming device in a display unit of a main body of this image-forming device (see FIG. 20 and FIG. 23 in Japanese Unexamined Patent Application Publication No. 2006-80855, for example). With this, an operator of the image-forming device is notified of the information about the user(s) of this image-forming device.

However, in such a management system, the user information displayed in the display unit of the main body of the image-forming device is configured by a character string(s) usually indicating a personal name(s) of the user(s) (such as a user name(s)).

On the other hand, viewers of the user information displayed in the display unit of the main body of the image-forming device (operators of the image-forming device) may include a new employee of a company having this image-forming device installed in its office and a person sent from a department different from a department having this image-forming device installed in its office (different department). Such an information viewer might not know people in the department (or company) having this image-forming device installed in its office. In such a situation, the operator (information viewer) of this image-forming device cannot associate these people with names displayed by character strings in the display unit of the main body of the image-forming device. In other words, these names do not remind the operator of faces of the people.

Therefore, for example, in a situation where a failure occurs in the image-forming device, the operator of this image-forming device does not recognize who is the administrating user among the people around the image-forming device even if the operator views information displayed in the display unit of this image-forming device and learns the name of the administrating user. Accordingly, it is not easy for the operator to find out and make contact with the administrating user of this image-forming device in an appropriate manner. Similarly, in a situation where a paper problem such as a paper jam occurs in the image-forming device, it is not easy for the operator of this image-forming device to find out the executing user (user using the image-forming device) among the people around the image-forming device even if the operator views information displayed in the display unit of this image-forming device and learns the name of the executing user of the executed job (user using the image-forming device).

Such a situation may occur not only in a management system having image-forming devices as management target devices, but also in a management system having various types of devices as management target devices.

SUMMARY OF THE INVENTION

An object of the present invention is to provide a management system capable of appropriately notifying a user (such as an operating user) of another user(s) of the management target device (such as an administrating user and/or a user in use), and a technique relating to such a system.

A first aspect of the present invention provides a management system for managing a management target device, the system including: the management target device; a position detection unit configured to detect a position of a user of the management target device; a management server configured to manage Air Tag information relating to the user; and a mobile terminal configured to receive the Air Tag information relating to the user from the management server, wherein the management server includes: a positional information acquisition unit configured to acquire positional information for the position of the user based on a result of the detection by the position detection unit; a generation unit configured to generate the Air Tag information including device-relating information and the positional information of the user, the device-relating information indicating an association between the user and the management target device; and a transmission unit configured to transmit the Air Tag information to the mobile terminal, and the mobile terminal displays, based on the Air Tag information of the user, an Air Tag image visualizing the device-relating information of the user in a display unit of the mobile terminal by superposing the Air Tag image over a portion representing the user within a shot image of scenery around the mobile terminal.

A second aspect of the present invention provides a management server for managing a management target device, the server including: a positional information acquisition unit configured to acquire positional information for a position of a user of the management target device; a generation unit configured to generate Air Tag information including device-relating information and the positional information of the user, the device-relating information indicating an association between the user and the management target device; and a transmission unit configured to transmit, to a mobile terminal, the Air Tag information relating to the user, the Air Tag information being for displaying an Air Tag in a display unit of the mobile terminal, and to cause an Air Tag image visualizing the device-relating information of the user to be displayed by being superposed over a portion representing the user within a shot image of scenery around the mobile terminal.

A third aspect of the present invention provides a computer-readable recording medium storing a program for causing a computer to execute the steps of: (a) acquiring positional information for a position of a user of a management target device; (b) generating Air Tag information including device-relating information and the positional information of the user, the device-relating information indicating an association between the user and the management target device; and (c) transmitting, to a mobile terminal, the Air Tag information relating to the user, the Air Tag information being for displaying an Air Tag in a display unit of the mobile terminal, thereby causing an Air Tag image visualizing the device-relating information of the user to be displayed by being superposed over a portion representing the user within a shot image of scenery around the mobile terminal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a data table for managing an administrating user and a user currently in use of one image-forming device;

FIG. 7 is a data table for managing an administrating user and a user currently in use of another image-forming device;

FIG. 8 is a data table for recording an association among the users, position sensor IDs, and positional information;

FIG. 9 is a data table of status information of the image-forming devices;

FIG. 10 is a management table for managing Air Tag information (Air Tag information management table);

FIG. 11 is an Air Tag information management table after alteration;

FIG. 13 is an Air Tag information management table (before alteration) according to a modified example;

FIG. 14 is the Air Tag information management table (after alteration) according to the modified example;

FIG. 15 is an Air Tag information management table (after alteration) according to a different modified example;

FIG. 18 is an Air Tag information management table according to the second embodiment;

FIG. 19 is a data table for managing a user currently using one network hub device, and the like;

FIG. 22 is an Air Tag information management table according to the third embodiment;

DESCRIPTION OF THE PREFERRED EMBODIMENTS

Hereinafter, embodiments of the present invention will be described with reference to the drawings.

1. First Embodiment

1-1. System Outline

Figure 1:
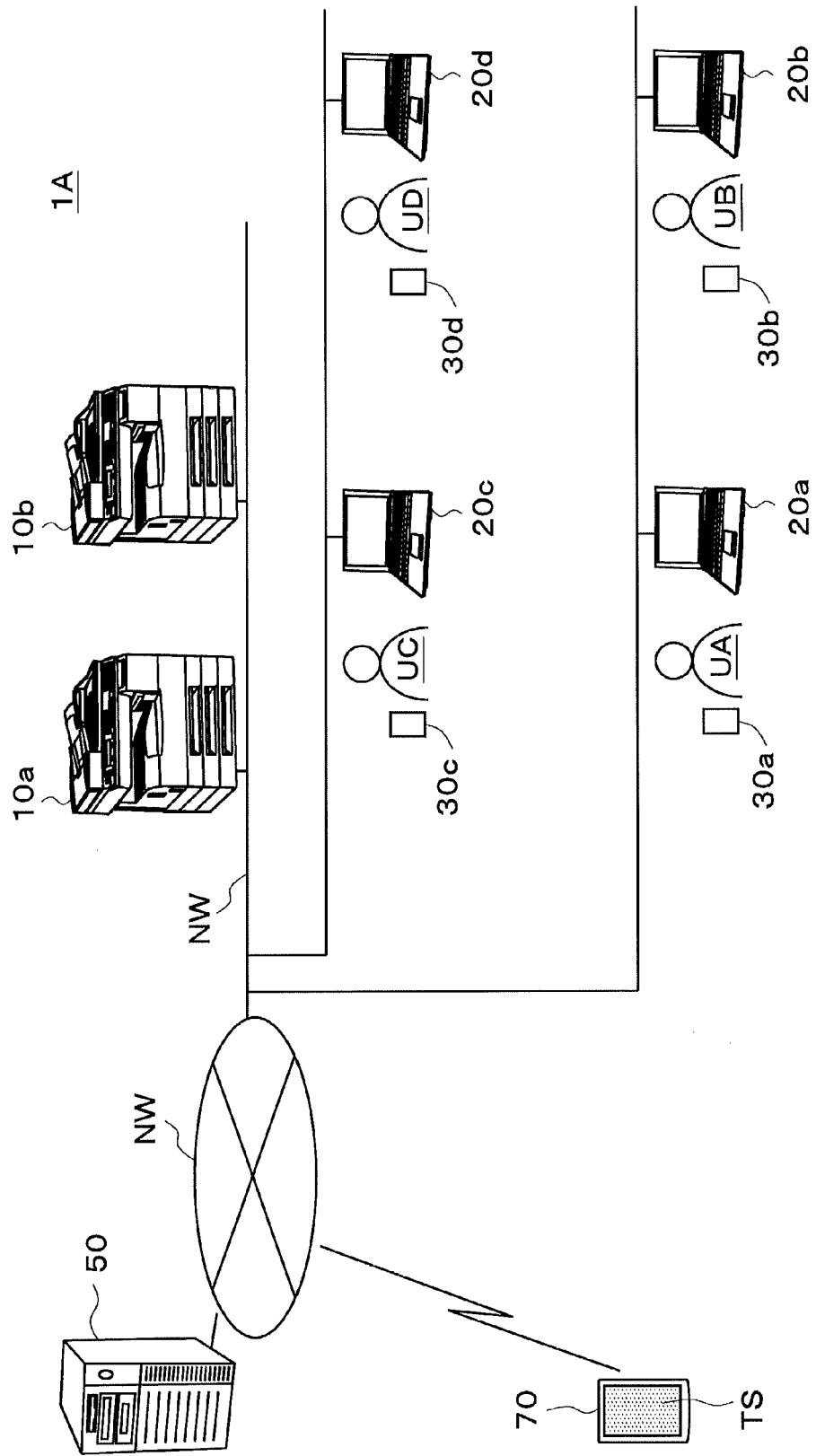
FIG. 1 illustrates a management system according to a first embodiment.

FIG. 1 illustrates a management system 1 (specifically, 1A) according to a first embodiment. Referring to FIG. 1, the management system 1A includes a plurality of image-forming devices 10 (10a, 10b, . . . ), a plurality of client computers 20 (20a, 20b, 20c, 20d, . . . ), a plurality of position detecting devices 30 (30a, 30b, 30c, 30d, . . . ), a server computer 50, and a mobile terminal 70.

The plurality of image-forming devices 10 (10a, 10b, . . . ), the plurality of client computers 20 (20a, 20b, . . . ), the plurality of position detecting devices 30 (30a, 30b, . . . ), the management server 50, and the mobile terminal 70 are connected to each other via a network NW. The network NW is configured as a LAN (Local Area Network), the Internet, or the like. Further, the connection to the network NW may be wired or wireless. For example, the image-forming devices 10, the clients 20, and the management server 50 are connected to the network NW by wired connection, and the position detecting devices 30 and the mobile terminal 70 are connected to the network NW wirelessly.

The management system 1A is a system for managing target devices (management target devices). In the management system 1A, the image-forming devices 10 (10a, 10b, . . . ) are the target devices for management (management target devices). Further, the server computer 50 is a computer for managing the management target devices, and also referred to as a management server.

In response to an operation by one of users Ui (UA, UB, . . . ), a corresponding one of the client computers (or simply referred to as clients) 20 (20a, 20b, . . . ) transmits a printing command to the image-forming device 10.

The position detecting devices 30 (30a, 30b, . . . ) are a device that performs a position detection operation (positioning operation) using a global positioning system (GPS). Each of the position detecting devices 30 is configured by a global positioning system (GPS) unit and the like. Further, the position detecting devices 30 are respectively carried by (taken along with) the users Ui of the image-forming devices 10. Each of the position detecting devices 30 detects a position Pi of the corresponding user Ui carrying this position detecting device 30 using the GPS unit built therein. Each position detecting device 30 includes a network communication unit, and transmits positional information about the position Pi detected using the GPS unit to the server computer 50 via the network NW as needed.

The management server (also simply referred to as a server) 50 also manages Air Tag information relating to the users. Here, the Air Tag information includes the positional information obtained by the position detecting devices 30 (positional information based on the global positioning system (GPS)) and the like. The "Air Tag information" is also referred to as "position-associated information", as being associated with the positional information.

The management server 50 generates the Air Tag information based on the positional information transmitted from the position detecting devices 30, status information transmitted from the image-forming devices 10 and the like, and stores the generated Air Tag information within the management server 50. Further, in response to a transmission request from the mobile terminal 70, the management server 50 transmits the Air Tag information for displaying an Air Tag to the mobile terminal 70.

The mobile terminal 70 receives the Air Tag information from the management server 50, and displays an "Air Tag" (specifically, an Air Tag image) in a display unit 76b thereof based on the received Air Tag information. In the mobile terminal 70, a program PG7 (not depicted) for displaying an Air Tag is executed, and the "Air Tag" is displayed using this program PG7.

The management system 1A is also a system for managing and utilizing the Air Tag information for each user using the management server 50 and the like, and is also referred to as an Air Tag information management system.

When executing the program PG7 in the mobile terminal 70 (described later), augmented reality is realized. Specifically, when the operating user of the mobile terminal 70 takes a shot image of scenery around the user using an imaging unit 72 built within this mobile terminal 70 (see FIG. 4), the shot image taken by the imaging unit 72 is displayed in the display unit 76b in real time like a video. At this time, the "Air Tag" is displayed by being superposed over the shot image. The "Air Tag" (specifically, the Air Tag image) is generated by visualizing additional information ("Air Tag information") related to an object within the shot image (here, a person (such as a user(s) (an administrating user and/or a user currently in use) of the image-forming device 10)).

Specifically, the "Air Tag information" relating to each person is associated with the positional information (GPS information) of this person obtained by the corresponding position detecting device 30 and stored in the management server 50 (specifically, in an Air Tag information storage unit 55c within the management server 50 (see FIG. 3)). On the other hand, when taking an image of a nearby person and the like (surrounding object), the mobile terminal 70 is able to obtain a current position of this mobile terminal 70 by an GPS unit 71 of the mobile terminal 70 (see FIG. 4). When the transmission request for the Air Tag information is given from the mobile terminal 70 to the management server 50 along with information of the current position of the mobile terminal 70, the management server 50 transmits, in response to this transmission request, the "Air Tag information" near the current position of a person who has taken the image to the mobile terminal 70 as a requestor. The mobile terminal 70 displays the received Air Tag information (specifically, an "Air Tag" visualizing the Air Tag information) by superposing the received Air Tag information over a portion representing the person within the shot image taken by the imaging unit 72. Specifically, the mobile terminal 70 derives a portion representing a target user as an object within the shot image based on a positional relation between the position of the mobile terminal 70 and the position of the target user indicated by the positional information within the Air Tag information (GPS information), a direction in which the image is taken by the mobile terminal 70, and the like. Then, the mobile terminal 70 displays the "Air Tag" by superposing the "Air Tag" over the portion representing the target user within the shot image in the display unit 76b of this mobile terminal 70.

1-2. Configuration of Image-Forming Device 10

Figure 2:
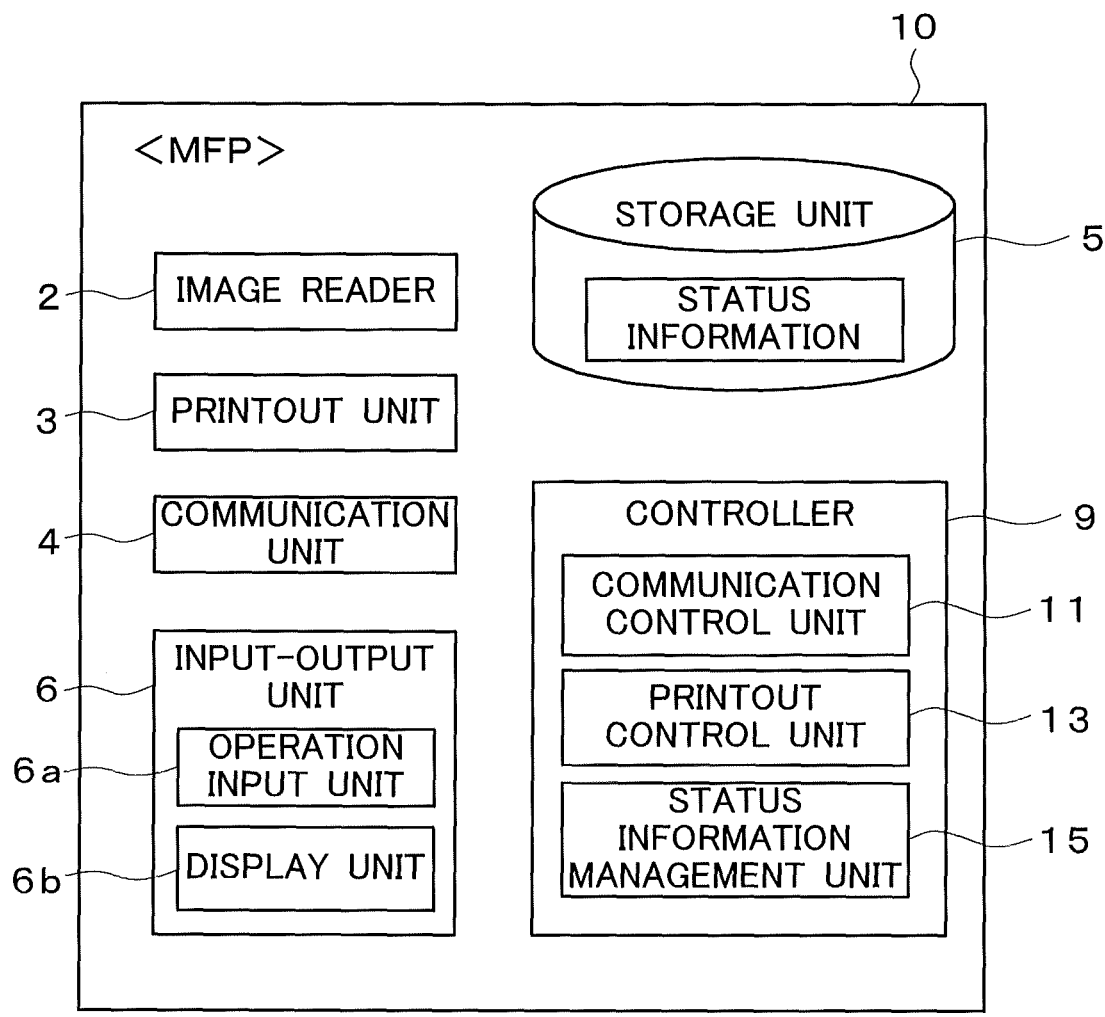
FIG. 2 illustrates functional blocks of an image-forming device.

FIG. 2 illustrates functional blocks of the image-forming device 10. In this embodiment, an MFP (Multifunction Peripheral) is described as an example of the image-forming device 10. In FIG. 2, functional blocks of the MFP 10 are shown.

The MFP 10 is a device (also referred to as a multifunction device) provided with a scanning function, a copying function, a facsimile function, a box storage function, and the like. Specifically, as illustrated in the functional block diagram in FIG. 2, the MFP 10 is provided with an image reader 2, a printout unit 3, a communication unit 4, a storage unit 5, an input-output unit 6, a controller 9 and the like, and realizes the various functions by multiple operations of these components.

The image reader 2 is a processor that optically reads (i.e., scans) a document placed on a predetermined position of the MFP 10 and generates image data of this document (also referred to as a document image or a scanned image). The image reader 2 is also referred to as a scanner.

The printout unit 3 is an output unit that prints an image out on a medium of a variety of types, such as paper, based on data relating to a printing object.

The communication unit 4 is a processor that is able to perform facsimile communication via the public line and the like. Further, the communication unit 4 is also able to perform network communication via the network NW. In the network communication, any of various protocols such as transmission control protocol/Internet protocol (TCP/IP) is used, for example. By using such a network communication, the MFP 10 is able to receive or transmit various data from or to a desired target (for example, the management server 50).

The storage unit 5 is configured by a storage device such as a hard disk drive (HDD). The storage unit 5 stores data relating to a print job. Further, the storage unit 5 also stores status information indicating a status of the image-forming device, and the like.

The input-output unit 6 includes an operation input unit 6a for accepting an input to the MFP 10 and a display unit 6b for outputting and displaying various information.

The controller 9 is a control device that is built within the MFP 10 and controls the MFP 10 in an overall manner. The controller 9 is configured as a computer system having a CPU, various semiconductor memories (RAM and ROM), and the like. The controller 9 realizes various processors by the CPU executing a predetermined software program (hereinafter also simply referred to as a program) PG1 stored in an ROM (e.g., EEPROM). The program (specifically, program modules) PG1 may be installed in a portable recording medium such as a USB memory (i.e., a computer-readable non-transitory recording medium of various types), or in the MFP 10 via the network NW and the like.

Specifically, as illustrated in FIG. 2, the controller 9 realizes various processors including a communication control unit 11, a printout control unit 13, and a status information management unit 15.

The communication control unit 11 is a processor for controlling a communication operation with other devices (such as the client 20 and the management server 50).

The printout control unit 13 controls a printout operation by the image-forming device 10.

The status information management unit 15 manages the status information (information indicating the status of the image-forming device 10). Further, the status information management unit 15 performs an operation of transmitting the status information to the management server 50 in cooperation with the communication control unit 11 and the like.

1-3. Configuration of Management Server 50

Figure 3:
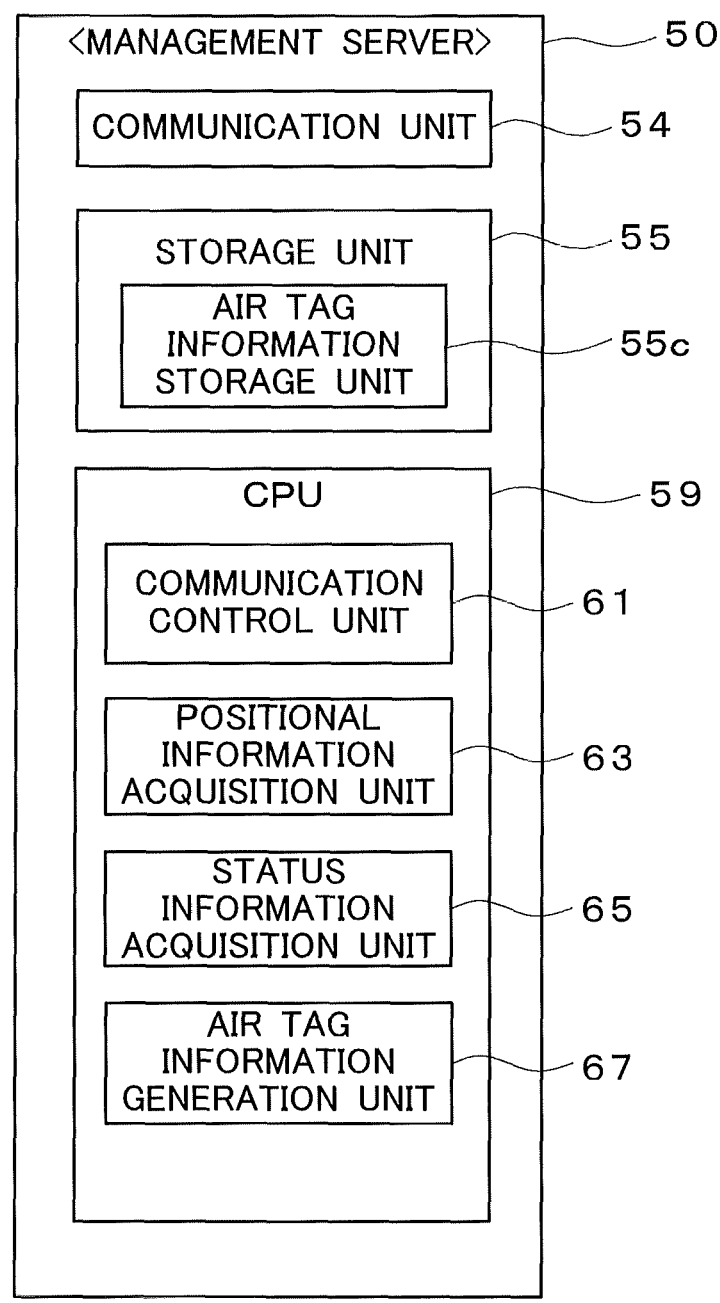
FIG. 3 illustrates functional blocks of a management server.

FIG. 3 illustrates functional blocks of the management server 50.

The management server 50 is configured as a computer system having a CPU, various semiconductor memories (RAM and ROM), and the like. Various processors are realized by the CPU of the management server (server computer) 50 executing a predetermined software program (hereinafter also simply referred to as a program) PG5. Specifically, as illustrated in FIG. 3, in the management server 50, various processors including a communication control unit 61, a positional information acquisition unit 63, a status information acquisition unit 65, and an Air Tag information generation unit 67 are realized. The program (specifically, program modules) PG5 may be stored in a portable recording medium such as a USB memory and a CD-ROM, read from the recording medium, and installed in the management server 50. Alternatively, the program PG5 may be downloaded via the network NW and the like, and installed in the management server 50.

The communication control unit 61 is a processor for controlling a communication operation with other devices (such as the image-forming device 10, the client 20, the position detecting device 30, and the mobile terminal 70).

The positional information acquisition unit 63 is a processor for acquiring positional information of the position Pi of each user Ui based on a result of the detection by the corresponding position detecting device 30. Specifically, the positional information acquisition unit 63 acquires the positional information detected by the position detecting device 30 (the positional information of the position Pi of user Ui), by receiving the positional information from the position detecting device 30 via the network NW.

The status information acquisition unit 65 is a processor for acquiring the status information of the image-forming device 10. The status information acquisition unit 65 receives and acquires the status information transmitted from the image-forming device 10 via the network NW.

The Air Tag information generation unit 67 is a processor for generating (specifically, such as newly generating or update-generating) the Air Tag information for each user. The Air Tag information for each user includes the positional information detected by the position detecting device 30 (the positional information relating to the position of each user). Further, the Air Tag information for each user also includes device-relating information indicating an association between the management target device and the each user (for example, information indicating that "the user is an administrating user of the management target device", "the user is a user currently using the management target device", etc.) (see FIG. 11).

The Air Tag information is transmitted to the mobile terminal 70 by the communication control unit 61 or the like. The mobile terminal 70 displays the Air Tag image visualizing the device-relating information of the user (for example, the information indicating that the user is the administrating user of the management target device) by superposing the information over a portion representing the user in the shot image of scenery around the mobile terminal 70.

1-4. Configuration of Mobile Terminal 70

Next, a configuration of the mobile terminal 70 will be described.

The mobile terminal 70 is a portable information input/output terminal device that can perform network communication with other devices. Examples of the mobile terminal 70 include smartphones and tablet devices.

Figure 4:
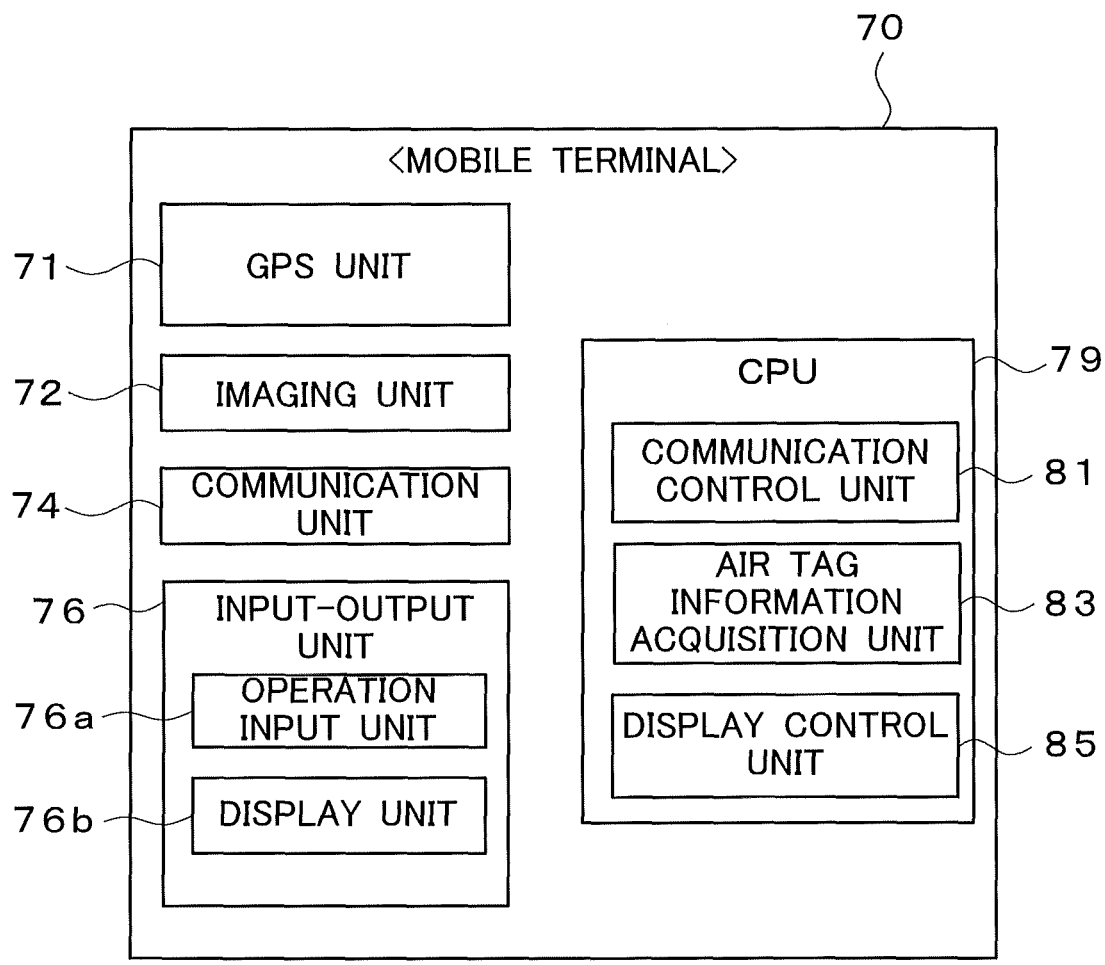
FIG. 4 illustrates functional blocks of a mobile terminal.

FIG. 4 is a functional block diagram schematically illustrating the configuration of the mobile terminal 70.

As illustrated in the functional block diagram of FIG. 4, the mobile terminal 70 is provided with the GPS unit 71, the imaging unit 72, a communication unit 74, an input-output unit 76, a controller 79 and the like, and realizes the various functions by multiple operations of these components.

The GPS unit 71 is a processor that performs positioning based on the global positioning system (GPS).

The imaging unit 72 is configured by an optical element such as a lens, a photoelectric conversion element such as a CDD, and the like. The imaging unit 72 is able to acquire a shot image in which objects (including a person) around the mobile terminal 70 are taken as photographic objects.

The communication unit 74 is able to perform network communication via the network NW. In the network communication, any of various protocols such as transmission control protocol/Internet protocol (TCP/IP) is used, for example. By using such a network communication, the mobile terminal 70 is able to receive or transmit various data from or to a desired target (such as the management server 50).

The input-output unit 76 includes an operation input unit 76a for accepting an input to the mobile terminal 70, and the display unit 76b for outputting and displaying various information. The mobile terminal 70 is provided with a touch screen TS configured such that a piezoelectric sensor and such are embedded in a liquid crystal display panel (see FIG. 1). The touch screen TS functions both as a part of the operation input unit 76a and a part of the display unit 76b.

The controller 79 is a control device that is built within the mobile terminal 70 and controls the mobile terminal 70 in an overall manner. The controller 79 is configured as a computer system having a CPU, various semiconductor memories (RAM and ROM), and the like. The controller 79 realizes various processors by the CPU executing a predetermined software program (hereinafter also simply referred to as a program) PG7 stored in a memory unit (such as a semiconductor memory). The program PG7 may be installed in a portable recording medium such as a USB memory, or in the mobile terminal 70 via the network NW and the like.

The program PG7 is application software using an augmented reality technique, and realizes various functions relating to the augmented reality.

Specifically, as illustrated in FIG. 4, the controller 79 realizes various processors including a communication control unit 81, an Air Tag information acquisition unit 83, and a display control unit 85.

The communication control unit 81 is a processor for controlling a communication operation with the management server 50 and the like in cooperation with the communication unit 74 and the like.

The Air Tag information acquisition unit 83 is a processor for acquiring the Air Tag information from the management server 50 via the network NW in cooperation with the communication control unit 81, the communication unit 74 and the like.

The display control unit 85 is a processor for controlling a display operation in the display unit 76b (such as the touch screen TS). The display control unit 85 controls a display operation of the "Air Tag" and the like.

1-5. Data Table

FIG. 6 is a data table TB11 for managing user information of the image-forming device 10a. The data table TB11 stores user information relating to an administrating user (administrator) of an image-forming device 10a and a user instructing a job in the image-forming device 10a (job executer).

Referring to FIG. 6, it is shown that the administrating user of the image-forming device 10a is a user with a user ID "Sato", and the user instructing a job that is currently executed in the image-forming device 10a (the user currently using the image-forming device 10a) is a user with a user ID "Tanaka".

Similarly, FIG. 7 is a data table TB12 for managing an administrating user of an image-forming device 10b and a user instructing a job in the image-forming device 10b.

Referring to FIG. 7, it is shown that the administrating user of the image-forming device 10b is a user with a user ID "Yamada", and the user instructing a job that is currently executed in the image-forming device 10b (the user currently using the image-forming device 10b) is a user with a user ID "Suzuki".

FIG. 8 is a data table TB20 for recording an association among the users (the users of the image-forming devices 10a, 10b, ...) Ui of the system 1A, position sensor IDs (position sensor identifiers), and the positional information (GPS information).

In the data table TB20 of FIG. 8, it is defined that a position sensor with a position sensor ID "ID101" is associated with the user with the user ID "Sato". Further, a latest piece of positional information PS (N1, E1, H1) for the position sensor with the position sensor ID "ID101" is recorded. Similarly, it is defined that a position sensor with a position sensor ID "ID102" is associated with the user with the user ID "Suzuki". Further, a latest piece of positional information PS (N2, E2, H2) for the position sensor with the position sensor ID "ID102" is recorded. This also applies to the other position sensors, and a corresponding user ID and a corresponding piece of the positional information PS are recorded for each position sensor (with a corresponding position sensor ID).

FIG. 9 is a data table TB30 of status information of the image-forming devices 10.

Referring to FIG. 9, the status information for the image-forming device 10a with a device ID "MFP 10a" indicates "paper problem (such as paper jam)", and the status information for the image-forming device 10b with a device ID "MFP 10b" indicates "normal". The data table TB30 records the status information acquired by the status information acquisition unit 65.

FIG. 10 is a management table MG1 (Air Tag information management table) for managing the Air Tag information. In FIG. 10, the management table MG1 (MG1a) for managing the Air Tag information for the MFP 10a is shown.

Referring to FIG. 10, the management table MG1 records a plurality of items (such as "tag ID", "user ID", "position sensor ID", and "positional information (GPS information)", "Air Tag display", "Air Tag display color", and "Air Tag character string") for each Air Tag. For example, at the top of the table, items (such as "user ID", "position sensor ID", "positional information (GPS information)", "Air Tag display", "Air Tag display color", and "Air Tag character string") relating to a tag ID "0001" are defined. The management table MG1 stores the Air Tag information generated by the Air Tag information generation unit 67.

The management table MG1 is an Air Tag management table relating to the users of the image-forming device 10a. Similarly, an Air Tag management table for users of the image-forming device 10b and the like is also stored in the server 50 for each MFP 10.

The data tables TB11, TB12, TB20, and TB30, the management table MG1, and the like are stored in the storage unit 5 of the management server 50.

1-6. Operations in System

Figure 5:
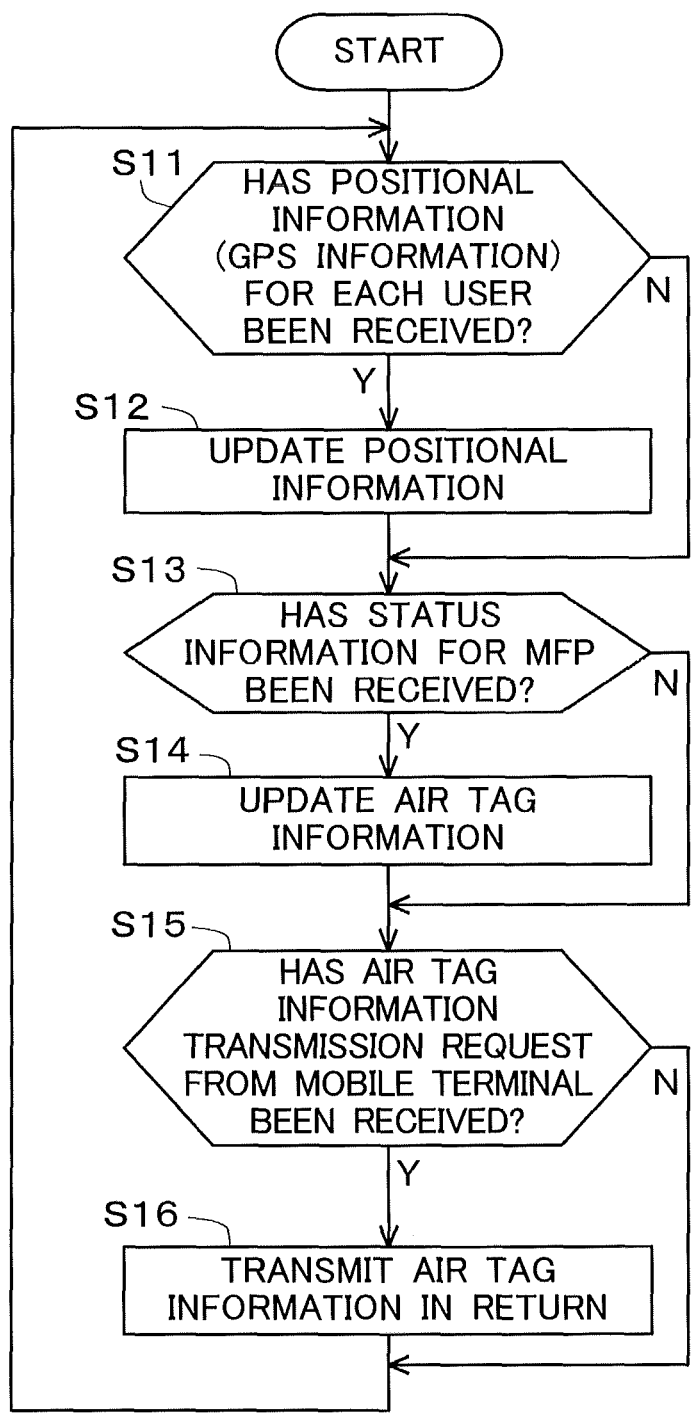
FIG. 5 is a flowchart showing an operation in a management server 50.

Next, operations and such in the system 1A will be described in detail with reference to FIG. 5. FIG. 5 is a flowchart showing operations of the management server 50.

In Steps S11 to S14, various steps for updating information are performed. In Steps S15 and S16, an Air Tag is displayed in the mobile terminal 70 in response to an Air Tag information transmission request.

Figure 24:
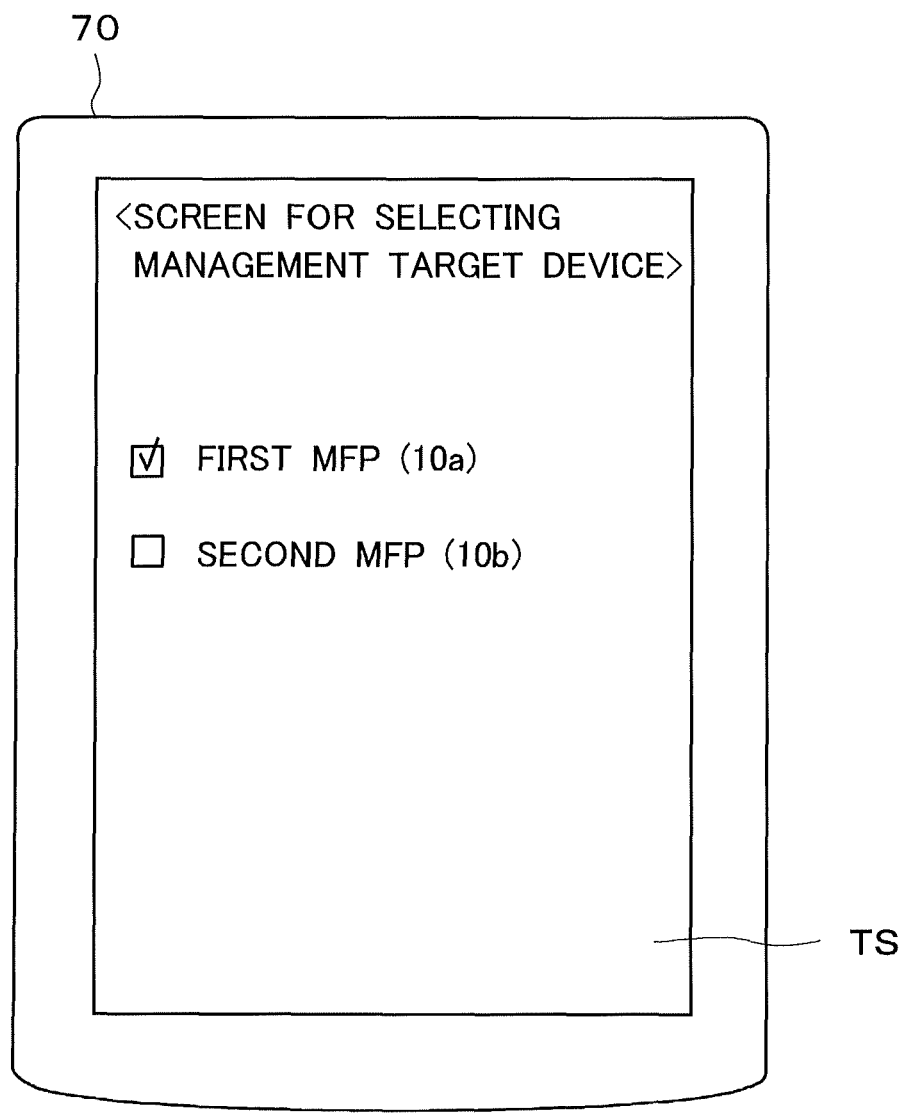
FIG. 24 illustrates a selection screen for selecting an image-forming device.

Here, it is assumed that, prior to Step S11, the image-forming device (e.g., a device having a paper problem) 10a is selected previously, as a target device for searching related users based on Air Tags, out of the plurality of image-forming devices 10. Specifically, an operator of the mobile terminal 70 may select the desired image-forming device 10a out of the plurality of image-forming devices 10a, 10b, . . . , using a selection screen as shown in FIG. 24. Further, it is assumed that the selection result in the selection screen of FIG. 24 is transmitted previously to the management server 50.

Each of the position detecting devices 30 detects a position of the user corresponding to this position detecting device 30 using its GPS unit, and transmits the detection result (positional information) and a position sensor ID of this position detecting device 30 to the management server 50 via the network NW at appropriate timing (at intervals of a few seconds, for example). Then, the management server 50 updates the data table TB20 (FIG. 8) and the management table MG1 (FIG. 10) based on the positional information and the position sensor ID that have been received.

In Steps S11 and S12, the positional information for each user is acquired, and the positional information within the data table TB20 of FIG. 8 and the positional information PS within the management table MG are updated.

Specifically, in Step S11, it is determined whether or not the positional information for each user has been received. When the positional information for the position of each user has been newly received, the process moves to Step S12. On the other hand, if the positional information has not been newly received, the process moves to Step S13. That is, the process moves to Step S13 without updating the Air Tag information according to the change in the positional information (Step S12).

For example, the process moves to Step S12 when the positional information PS (N1, E1, H1) and the position sensor ID "ID101" have been transmitted from the position detecting device 30, and the management server 50 updates the positional information (the positional information associated with the position sensor ID "ID101") in the data table TB20 (FIG. 8) based on the received positional information. Further, based on the association between the position sensors and the users defined in the data table TB20, the management server 50 updates the positional information for the user ID "Sato" associated with the position sensor ID "ID101" in the management table MG1 of FIG. 10. With this, the management server 50 updates the positional information within the management table MG1, specifically, positional information of a tag "0001" associated with the position sensor ID "ID101".

Next, in Steps S13 and S14, the status information of the image-forming device 10 is acquired, and the "status information" within the data table TB30 (FIG. 9) and the items related to the display of Air Tags (Specifically, "Air Tag display", "Air Tag display color", and "Air Tag character string") within the management table MG1 (FIG. 10) are updated. These items related to the display of Air Tags define specification information DM for specifying a display mode (whether to be displayed or not and the display color) of an "Air Tag" (specifically, an Air Tag image) and the character string to be displayed.

Each of the image-forming devices 10 transmits, when the status information of this image-forming device 10 changes, the status information after the change and its device ID to the management server 50 via the network NW. Then, the management server 50 updates the data table TB30 (FIG. 9) and the management table MG1 (FIG. 11) based on the status information and the device ID that have been received (Steps S13 and S14). In other words, the management server 50 (specifically, the Air Tag information generation unit 67) generates (specifically, updates) Air Tag information for a specific user within the management table MG1.

Specifically, in Step S13, it is determined whether or not the status information of the image-forming device 10 has been received. When the status information of the image-forming device 10 has been newly received, the process moves to Step S14. On the other hand, if the status information of the image-forming device 10 has not been newly received, the process moves to Step S15. That is, the process moves to Step S15 without updating the Air Tag information according to the change in the status information (Step S14).

When the status information has not been updated in Steps S13 and S14, Steps S15 and S16 are performed, and Air Tag display processing is executed based on the Air Tag information.

For example, the process moves to Step S14 when the status information "paper problem (such as paper jam)" (one of abnormal states) and the device ID "the MFP 10a" have been transmitted from the image-forming device 10a, and the management server 50 updates the status information in the data table TB30 (the status information associated with the device ID "MFP 10a") based on the received status information. Further, the management server 50 specifies a user associated with the status after alteration (status-associated user) based on the data table TB11 (FIG. 6) relating to the image-forming device 10a with the device ID "the MFP 10a".

Examples of the specified status-associated user associated with the status "paper problem (such as paper jam)" after alteration include "Sato", the administrating user of the image-forming device 10a and the user instructing a job in the image-forming device 10a (such as "Tanaka", the user instructing a job that is currently executed) are specified. Then, the management server 50 alters contents of the items related to the display of Air Tags in the management table MG1 of FIG. 10 for a tag (record) associated with the user ID of this person ("Sato" or "Tanaka") (see FIG. 11). FIG. 11 shows contents of the management table MG1 after alteration.

Specifically, as shown in FIG. 11, the items related to the display of Air Tags for the tag ("0001") associated with the user ID "Sato" are altered. More specifically, the item "Air Tag display" for the tag ("0001") is altered from "not displayed (without display)" to "displayed (with display)". That is, whether to be displayed or not is altered. Further, the item "Air Tag color" for this tag is altered to "red". That is, the display color is altered. Moreover, the item "Air Tag character string" for this tag is altered to "Administrator of the MFP 10a". That is, the character string to be displayed is altered. The Air Tag character string (Air Tag display character string) is the device-relating information indicating the association between the user ("Sato") and the management target device (the image-forming device 10a), and shows that this user is an administrating user of the management target device.

Further, the items related to the display of Air Tags for a tag ("0003") associated with the user ID "Tanaka" are altered. More specifically, the item "Air Tag display" for the tag ("0003") is altered from "not displayed" to "displayed", the item "Air Tag color" for this tag is altered to "yellow", and the item "Air Tag character string" for this tag is altered to "Currently using the MFP 10a to execute a job". The Air Tag character string (Air Tag display character string) is the device-relating information indicating the association between the user ("Tanaka") and the management target device (the image-forming device 10a), and shows that this user is the user currently using the management target device.

In this manner, the management server 50 (such as the Air Tag information generation unit 67) alters the content of the items related to the display of Air Tags, specifically, the specification information DM (the specification information for specifying a display mode of the "Air Tag" (specifically, the Air Tag image) (whether to be displayed or not and the display color), the character string to be displayed, and the like) within the management table MG1, according to the change in the status of the management target device, and updates the Air Tag information. As will be described later, the display of the Air Tag in the mobile terminal 70 is updated according to this update operation. Specifically, the Air Tag information generation unit 67 alters the display mode of the Air Tag image and the character string to be displayed by altering the specification information DM within the management table MG1.

Further, in Steps S15 and S16, upon acceptance of the Air Tag information transmission request from the mobile terminal 70, the management server 50 transmits the Air Tag information of a person around the mobile terminal 70 to the mobile terminal 70 in return in response to this transmission request.

For example, the mobile terminal 70 acquires a current position of the mobile terminal 70 using the GPS unit 71 (see FIG. 4) when taking an image of a nearby person and the like (surrounding objects), and supplies the management server 50 with the transmission request for the Air Tag information along with the positional information of the current position of the mobile terminal 70.

On the other hand, the management server 50 transmits, in response to this transmission request, the "Air Tag information" in the vicinity of the current position of the person who has taken the image (the user operating the mobile terminal 70) to the mobile terminal 70 as a requestor. The mobile terminal 70 displays the received Air Tag information (specifically, the "Air Tag" visualizing the Air Tag information) by superposing the received Air Tag information over a portion representing the person in the shot image taken by the imaging unit 72.

Figure 12:
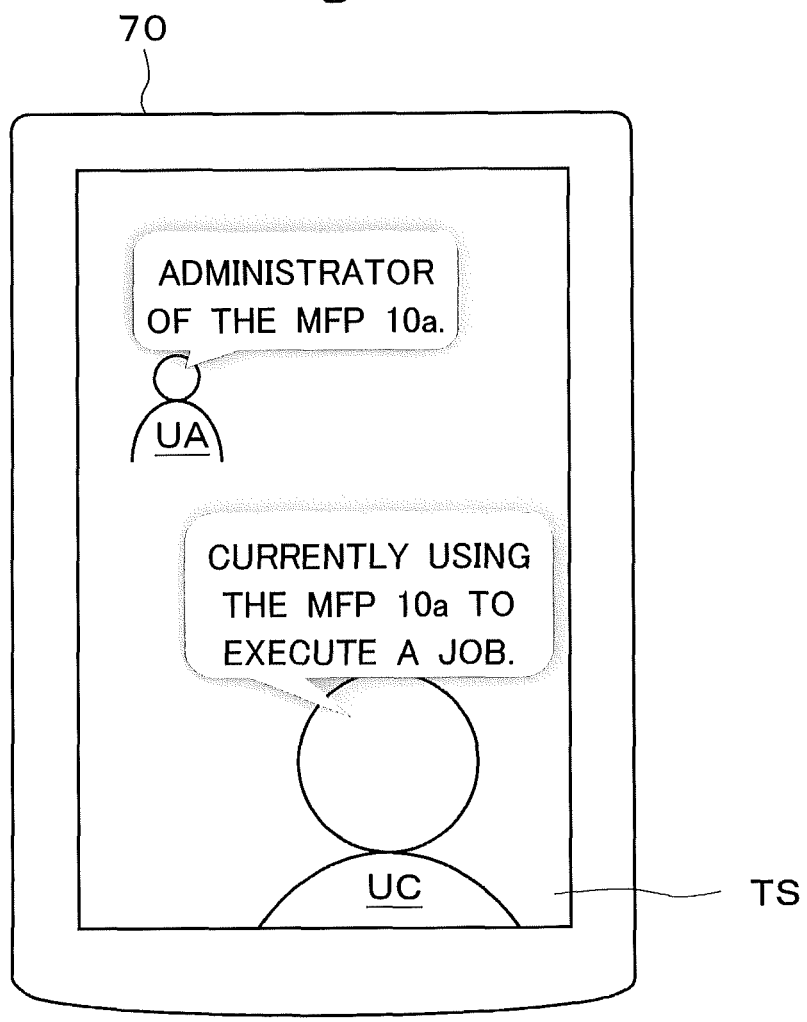
FIG. 12 illustrates a display example of Air Tags.

FIG. 12 illustrates a display example of the Air Tag. Referring to FIG. 12, in the display unit 76b (the touch screen TS) of the mobile terminal 70, an Air Tag related to a person is displayed by being superposed over the portion representing the person in the shot image. For example, the character string "Administrator of the MFP 10a" (specifically, a balloon image including the character string) and such are displayed by being superposed over the portion representing the user UA ("Sato") in the shot image. Similarly, the character string "Currently using the MFP 10a to execute a job" and such are displayed by being superposed over a portion representing a user UC ("Sato") in the shot image. In this manner, based on the Air Tag information for the user, the mobile terminal 70 displays the Air Tag image visualizing the "device-relating information" of the user in the display unit 76b by superposing the Air Tag image over the portion representing the user in the shot image of scenery around the mobile terminal 70.

By looking at such a superposed image, the operating user of the mobile terminal 70 is able to recognize the administrating user and/or the user currently in use of the image-forming device 10a even if the operating user does not know the administrating user and/or the user currently in use of the image-forming device 10a (especially when the operating user does not know the faces of these people). Therefore, for example, it is possible to notify the administrating user and/or the user instructing execution of a currently executed job (user currently in use) of the image-forming device 10a of the fact that there is a "paper problem" in the MFP 10a.

In this manner, according to the embodiment described above, the Air Tag image visualizing the device-relating information within the Air Tag information relating to a specific user of the management target device 10a is displayed by being superposed over the portion representing the specific user in the shot image in the mobile terminal 70. With this, a viewer (system user) of the mobile terminal 70 is able to recognize the association between the specific user and the management target device 10a based on the device-relating information. In other words, the management server 50 is able to appropriately notify a user of this system (the viewer of the mobile terminal 70) (in other words, notify in a manner easy to understand) of a specific user of the management target device 10. As a result, the operator of the mobile terminal 70 is able to easily find the administrating user and/or the user in use of the image-forming device 10a.

In particular, according to the status change of the image-forming device 10a from a state in which the device is unused by the user UA (the state in which the user UA does not use the image-forming device 10a) to a state in which the device is used by the user UA (the state in which the user UA is using the management target device), the contents of the management table MG1 (especially, the specification information DM) are altered, and the display mode and the character string to be displayed of the Air Tag image are altered. Therefore, it is possible to display an appropriate Air Tag in the mobile terminal 70 according to the situation.

Then, the same processing is repeatedly executed. Specifically, the various steps for updating the information are performed in Steps S11 to S14, and an Air Tag is displayed in the mobile terminal 70 in response to the Air Tag information transmission request in Steps S15 and S16.

In particular, when the content of the Air Tag to be displayed is updated according to the update of the status information in Steps S13 and S14, then (in Step S16), an Air Tag reflecting the status change of the image-forming device 10 is displayed in the mobile terminal 70.

For example, when the status of the image-forming device 10a resumes the normal state from the abnormal state, the content of the Air Tag information as shown in FIG. 10 is resumed from the content as shown in FIG. 11. Then, an Air Tag based on the Air Tag information of FIG. 10 is displayed in the mobile terminal 70. At this time, the Air Tags for the specific users ("Sato" and "Tanaka") are not displayed. With this, it is possible to prevent an Air Tag that is not necessary from being displayed.

Further, when the status of the image-forming device 10a changes again (the status change from the normal state to the abnormal state), and the Air Tag information changes from the content shown in FIG. 10 to the content shown in FIG. 11 (in other words, when the specification information DM is altered), the Air Tags based on the Air Tag information of FIG. 11 are again displayed in the mobile terminal 70. Specifically, Air Tags as shown in FIG. 12 are displayed. With this, similarly to the manner described above, the operator of the mobile terminal 70 is able to easily find the administrating user and/or the user in use of the image-forming device 10a.

1-6. Modified Examples of First Embodiment

The above embodiment describes the example in which the Air Tags for the specific users are displayed in the "paper problem", but the present invention is not limited to such an example, and the Air Tags for the specific users may be displayed in a different abnormal state (for example, "failure" state). Specifically, the Air Tag for the administrating user may be displayed in the mobile terminal 70 in the failure state of the image-forming device 10a. With this, the operator of the mobile terminal 70 is able to easily find the administrating user of the image-forming device 10a when the image-forming device 10a is in failure.

Further, while the above embodiment describes the example in which the Air Tag for the administrating user and the Air Tag for the user currently in use are both displayed in the state of "paper problem", the present invention is not limited to such an example. For example, only the Air Tag for the user currently in use may be displayed in the state of "paper problem" (the Air Tag for the administrating user is not displayed).

Moreover, while the above embodiment describes the example in which the Air Tag for the administrating user is shown in red and the Air Tag for the user currently in use is shown in yellow in the state of "paper problem" (see FIG. 11), the present invention is not limited to such an example. For example, the display colors may be altered depending on the status of the image-forming device 10. Specifically, when the image-forming device 10 is in the "failure" state, the Air Tag for the administrating user relating to the "failure" state may be shown in "red", and when the image-forming device 10 is in the "paper problem (paper jam)" state, the Air Tag for the user currently in use relating to the "paper problem" state may be shown in "yellow".

Furthermore, while the above embodiment describes the example in which no Air Tag is displayed when the status of the management target device is "normal", the present invention is not limited to such an example. For example, an Air Tag may be displayed when the status is "normal". However, in this case, it is preferable that display colors and such are altered according to the alteration of the status information. For example, when the status information is altered from "normal" to "paper problem", the display color of the Air Tag for "Sato" the administrating user of the image-forming device 10a may be altered from "blue" (see FIG. 13) to "red" (FIG. 14). Similarly, when the status information is altered from "normal" to "paper problem", the display color of the Air Tag for "Tanaka" who is currently using the image-forming device 10a to execute a job may be altered from "blue" (see FIG. 13) to "yellow" (FIG. 14).

Further, considering a plurality of Air Tags are given to a single person, "priorities" of the plurality of tags may be defined as one of display-relating items (display mode specifying items), and the plurality of Air Tags may be displayed based on the priorities.

Figure 16:
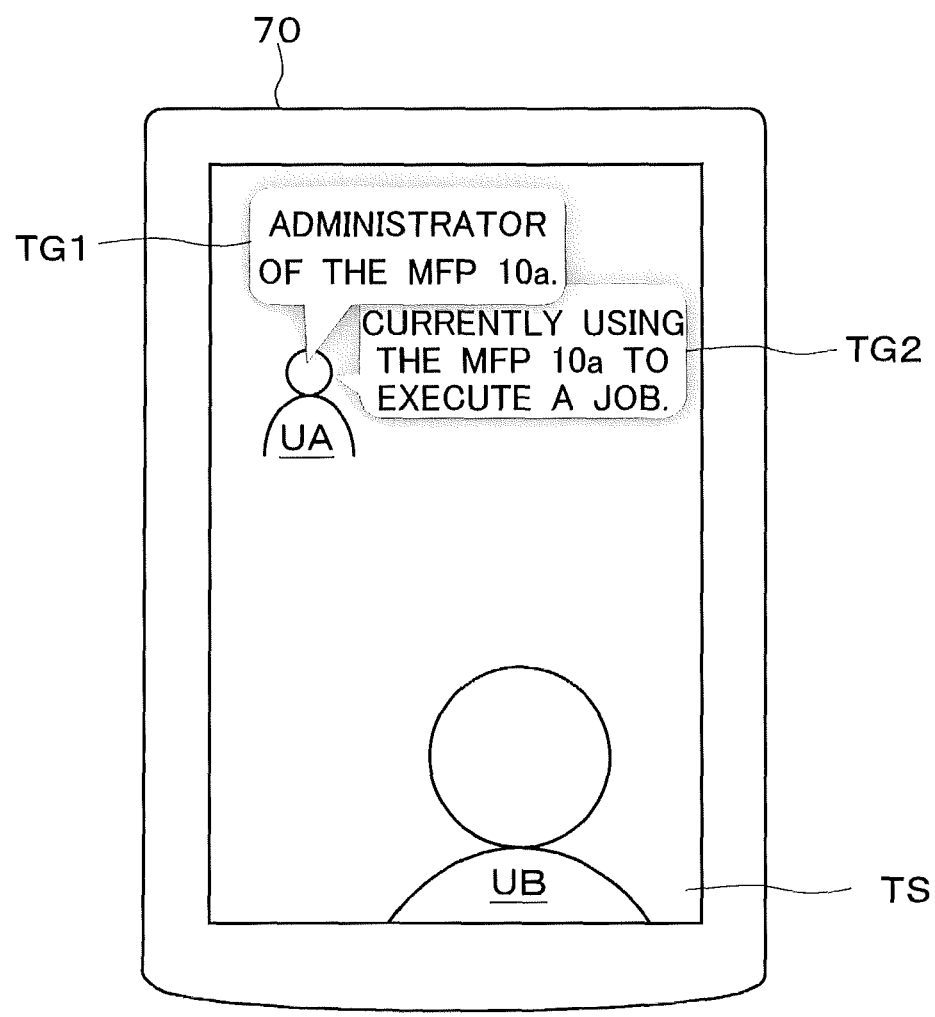
FIG. 16 illustrates a display example of Air Tags according to the different modified example.

For example, as shown in FIG. 15, in a case where two Air Tags are given to a person called "Sato", the Air Tag TG1 (tag ID "0001") associated with the administrating user is given a relatively higher priority "1", and the Air Tag TG2 (tag ID "101") associated with the user currently in use is given a relatively lower priority "2". Then, as shown in FIG. 16, out of the Air Tags TG1 and TG2, the Air Tag TG1 with the relatively higher priority "1" is displayed on top of (with priority over) the Air Tag TG2 with the relatively lower priority "2". In other words, the Air Tag TG1 is displayed over the Air Tag TG2. Overlapping display between the plurality of Air Tags may be controlled in this manner.

Moreover, when a plurality of tags are given to one person, an arrangement of the plurality of tags is not limited to the example in which the plurality of tags are displayed overlappingly with each other, and the plurality of tags may be arranged vertically or horizontally side by side. In this case, positions of tags within the arrangement may be determined based on the priorities described above.

Furthermore, the above embodiment describes the example in which the management server 50 manages the data tables TB11, TB12, and TB30, the status information of the image-forming device 10 is transmitted to the management server 50, the user ID and updated contents of the display-relating items for the Air Tag are determined based on this status information in the management server 50, and the Air Tag information is updated. However, the present invention is not limited to such an example.

For example, it is possible to employ a configuration in which the image-forming device 10 manages the data table TB11, TB12, and TB30, determines the user ID to be updated and updated contents of the display-relating items for the Air Tag according to the status after alteration (see FIG. 11), and supplies the management server 50 with an instruction for updating the Air Tag information via the network NW. The management server 50 may update an Air Tag, in response to the update instruction, based on the contents included in this update instruction (specifically, the user ID to be updated and the updated contents of the display-relating items for the Air Tag).

Further, while the above embodiment describes the example in which it is recorded that the "specific user is a user instructing a job (user currently in use)" in the Air Tag information as the device-relating information, the present invention is not limited to such an example. For example, it is possible to record that the "specific user is a user instructing a latest completed job that has been completed a predetermined time before (such as a job that has been completed 10 minutes before)" in the Air Tag information as the device-relating information, and the Air Tag may be displayed based on this information.

Moreover, while the above embodiment describes the example in which a user instructing a currently executed job in the image-forming device 10*a* is specified as a user instructing a job in the image-forming device 10 (status-associated user), the present invention is not limited to such an example. For example, in addition to the user instructing the currently executed job, the user instructing the latest completed job that has been completed the predetermined time before (for example, 10 minutes before) may also be specified as the status-associated user. Then, the Air Tag related to the user (the user instructing the latest completed job) may be displayed.

2. Second Embodiment

Next, a second embodiment will be described. The second embodiment is a modified example of the first embodiment. In the following, the description will be given focusing on differences from the first embodiment.

While an image-forming device is exemplified as the management target device in the first embodiment and the like described above, a network hub device is exemplified as the management target device in the second embodiment.

Figure 17:
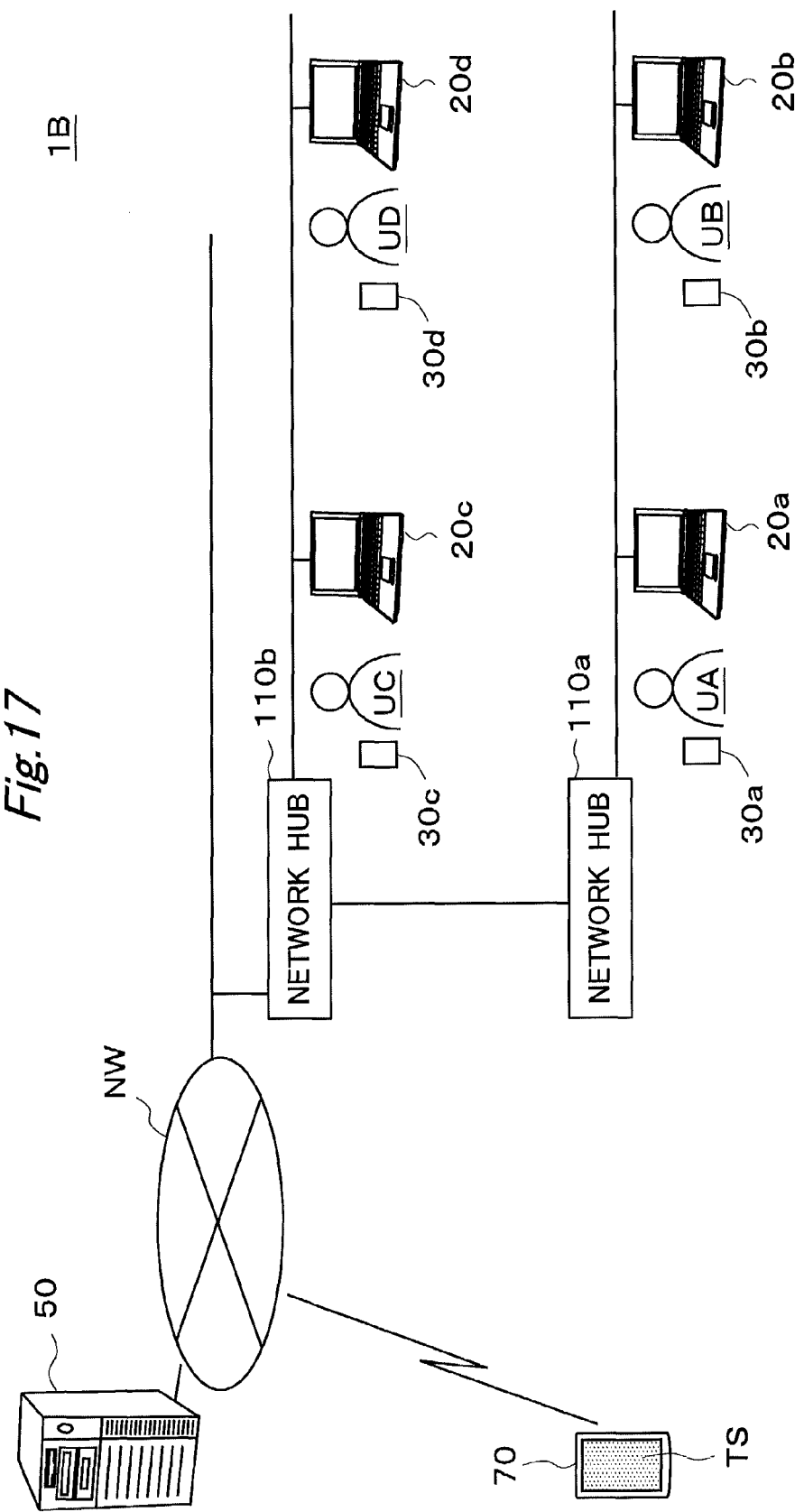
FIG. 17 illustrates a management system according to a second embodiment.

FIG. 17 illustrates a configuration of a management system 1B according to the second embodiment.

Referring to FIG. 17, the management system 1B according to the second embodiment includes network hub devices 110 in place of the image-forming devices 10. Each of the network hub devices 110 (110*a* and 110*b*) is connected with the clients 20. Each of the users Ui (UA, UB, UC, and UD) uses one of the network hub devices 110 when connecting the client 20 (20*a*, 20*b*, 20*c*, and 20*d*) of this user to the network NW. Other than this, the configuration is the same as that in the first embodiment.

FIG. 18 is a management table MG2 (Air Tag information management table) stored in the management server 50 (also referred to as 50B) according to the second embodiment. FIG. 18 shows the management table MG2 (MG2*a*) for managing the Air Tag information for the network hub device 110*a*. Similarly, the management table MG2 (MG2*b*) for managing the Air Tag information for the other network hub device 110*b* is also stored in the management server 50.

When the client 20*a* of the user UA ("Sato") is connected to the network hub device 110*a* (in a power-on state), it is determined that "the user UA of the client 20*a* is a user using the network hub device 110*a*" by this network hub device 110*a*. On the other hand, when the client 20*b* is not connected to the network hub device 110*a* (in a power-on state), it is determined that "the user UB of the client 20*b* is not a user using the network hub device 110*a*" by the network hub device 110*a*. As will be described later, based on such a determination result, the management table MG2 of FIG. 18 stores contents that reflect the connection status of the other devices (clients 20) to the network hub device 110*a*.

According to the second embodiment, a situation is assumed in which the operator gives a caution in verbal communication to a user who is being connected to the network hub device 110*a* (the user using the network hub device) before disconnecting the network hub device 110*a* in the management system 1B from a relatively higher order of the network.

Also in the second embodiment, the same operation as in the first embodiment (see FIG. 5) is performed.

However, according to the second embodiment, the status information of this device (management target device) is transmitted to the management server 50 from the network hub device 110, instead of the image-forming device 10.

Specifically, the network hub device 110*a* transmits a specific IP address of the network device that is connected and connection status information for the network hub device 110*a* (information relating to a device connected to this network hub device) to the management server 50. For example, the network hub device 110*a* transmits an IP address (192.168.1.10) of the client 20*a* that is connected to this device 110*a* and connection status information for the network hub device 110*a* (that the network hub device (ID "HUB110a") is being connected to a network device with a specific IP address (192.168.1.10)) to the management server 50. This transmitting operation may be performed at appropriate timing (for example, at timing of periodical status report, at timing when the connection status of the network hub device 110*a* is altered, at timing when the network hub device 110*a* itself is turned on, or the like).

When the management server 50 receives the status information (connection status information) from the network hub device 110*a* in Step S13, the process moves to Step S14.

In Step S14, the management server 50 first updates user information in a data table TB111 (FIG. 19) based on the received connection status information. Specifically, the management server 50 specifies the user ("Sato") associated with the received IP address ("192.168.1.10") based on the table TB111, and describes the specified user as a "user in use" of the network hub device 110*a* in the data table TB111. FIG. 19 is the data table TB111 showing an association among the user ID of each user, the IP address of the client 20 of each user, and a status of use of the management target device by the user. The data table TB111 is a data table for the network hub device 110*a* (management target device), and provided within the management server 50. Similarly, a data table TB112 for the network hub device 110*b* (not depicted) is also provided within the management server 50.

Further, the management server 50 determines the Air Tag information ("0001") associated with the specified user ("Sato") based on a management table MG2.

Next, the management server 50 updates the contents of the display-relating items of the determined Air Tag information. For example, the management server 50 alters the Air Tag display for the Air Tag information ("0001") from "not displayed" to "displayed", and alters the Air Tag display color for the Air Tag information ("0001") to "red". In addition, the management server 50 alters the Air Tag character string of this Air Tag information to "Currently in use".

FIG. 18 shows the content of the management table MG2 after alteration. The "Air Tag character string" (Air Tag display character string) at rightmost column is the device-relating information showing an association between the user and the management target device. The "Air Tag character string" of the Air Tag information for the tag ID "0001" shows that this user ("Sato") is a user currently using the management target device (the network hub device 110a ("HUB110a")).

Then, after updating the Air Tag information in this manner, upon acceptance of the Air Tag information transmission request from the mobile terminal 70, the management server 50 transmits the Air Tag information of a person around the mobile terminal 70 to the mobile terminal 70 in return in response to this transmission request (Steps S15 and S16).

Figure 20:
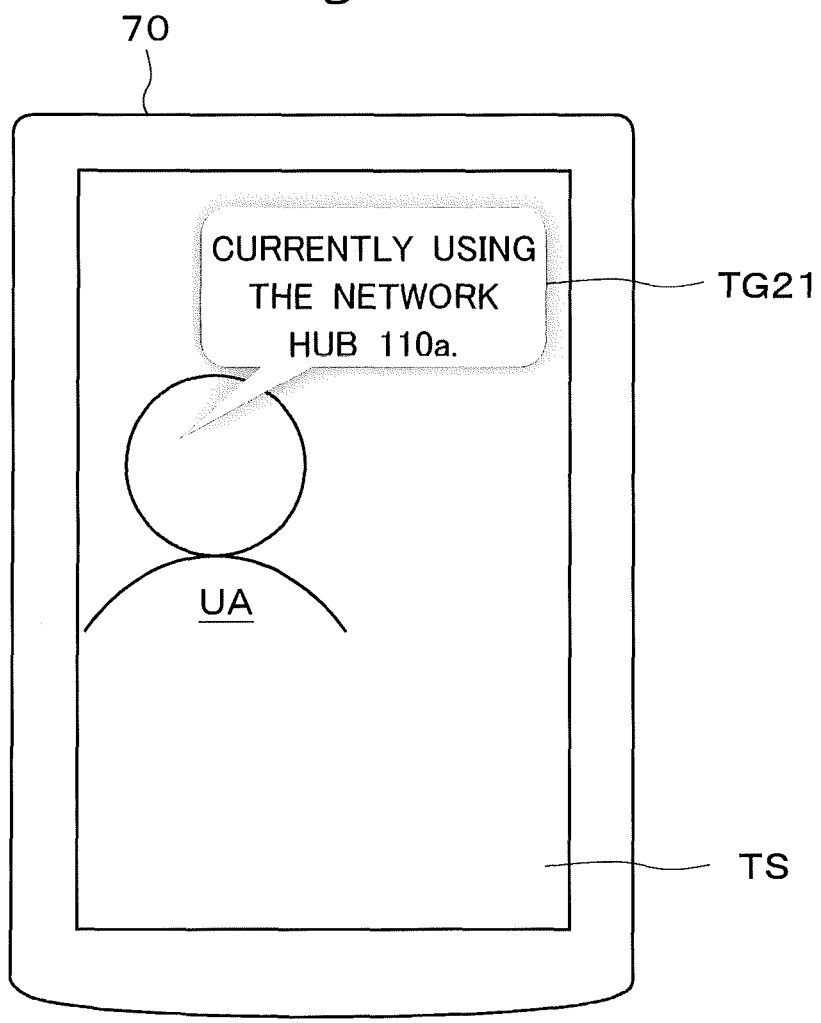
FIG. 20 illustrates a display example of an Air Tag according to the second embodiment.

As a result, an Air Tag TG21 as shown in FIG. 20 is displayed in the display unit 76b of the mobile terminal 70. Specifically, in the display unit 76b (the touch screen TS) of the mobile terminal 70, an Air Tag related to a person is displayed by being superposed over the portion representing the person in the shot image. For example, the character string "Currently using the network hub device 110a" and such are displayed by being superposed over the portion representing the user UA ("Sato") in the shot image. In this manner, based on the Air Tag information for the user UA, the mobile terminal 70 displays the Air Tag image visualizing the "device-relating information" of the user UA in the display unit 76b by superposing the Air Tag image over the portion representing the user UA in the shot image of scenery around the mobile terminal 70.

By looking at such a superposed image, the operating user (the operator) of the mobile terminal 70 is able to recognize the user currently using the network hub device 110a, even if the operating user does not know the person UA (especially when the operating user does not know the face of the person UA). Therefore, it is possible to give a caution to the user (user using the network hub device 110a) who is being connected to the network hub device 110a more easily, before performing the disconnection operation of the network hub device 110a from a relatively higher order of the network, for example.

3. Third Embodiment

Next, a third embodiment will be described. The third embodiment is a modified example of the second embodiment. In the following, the description will be given focusing on differences from the second embodiment.

While the network hub device is exemplified as the management target device in the second embodiment, a power strip device is exemplified as the management target device in the third embodiment.

Figure 21:
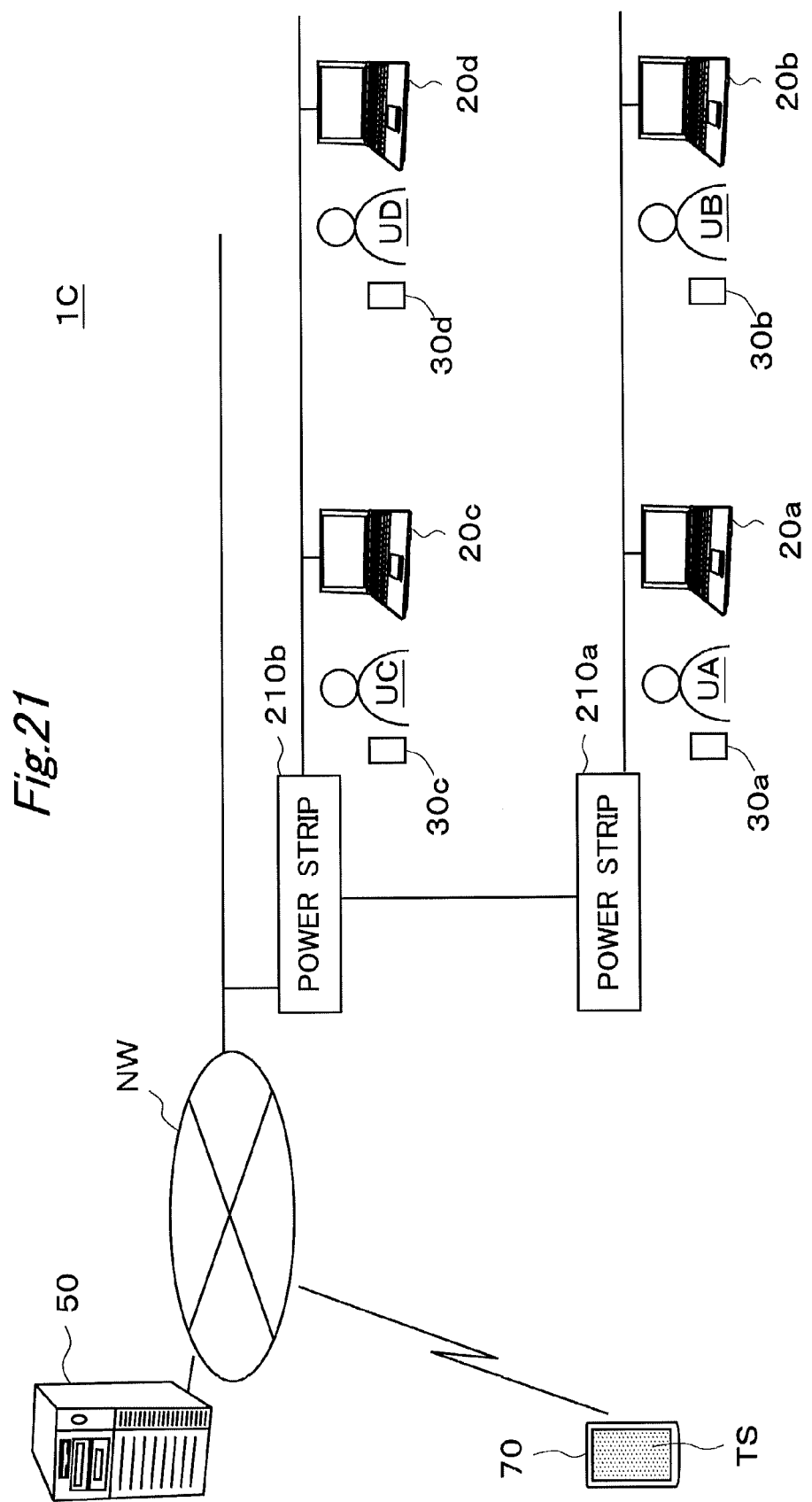
FIG. 21 illustrates a management system according to a third embodiment.

FIG. 21 illustrates a configuration of a management system 1C according to the third embodiment. In the management system 1C, power strip devices 210 (210a, 210b, 210c, and 210d) are provided in place of the network hub devices 110 (110a, 110b, 110c, and 110d) of the management system 1B according to the second embodiment (FIG. 17).

The power strip devices 210 are devices capable of supplying power to a plurality of devices (here, the clients 20). Further, the power strip devices 210 are able to perform power line communication with the clients 20 that are power supply destinations, and able to acquire information (connection status information) indicating whether or not the clients 20 are connected to the corresponding power strip devices 210. Further, the power strip device 210 can also perform communication with the management server 50.

The power strip device 210 transmits the connection status information of the power strip device 210 to the management server 50. The management server 50 generates (updates and the like) the Air Tag information based on the received connection status information and the like. The mobile terminal 70 receives the Air Tag information reflecting the connection status information from the management server 50, and displays the Air Tag based on the Air Tag information.

According to the third embodiment, a situation is assumed in which the operator gives a caution in verbal communication to a user who is being connected to the power strip device 210a (the user using the power strip device 210) before disconnecting the power strip device 210a in the management system 1C from a relatively higher order of the power supply line.

In the third embodiment, the same operation as in the second embodiment (see FIG. 5) is performed. However, according to the third embodiment, the status information of this device (management target device) is transmitted to the management server 50 from the power strip device 210, instead of the network hub device 110. In the third embodiment, the power strip device 210 that is being connected is specified using a PC ID and the like in place of the IP address. The PC ID is a device identifier given to each client 20, and managed by the management server 50 in association with the corresponding client 20 (and the corresponding user Ui).

When the management server 50 receives the status information (connection status information) from the power strip device 210a in Step S13 (FIG. 5), the process moves to Step S14.

In Step S14, the management server 50 updates the Air Tag information based on the received connection status information.

FIG. 22 shows the content of a management table MG3 after updating. The "Air Tag character string" (Air Tag display character string) at rightmost column is the device-relating information showing an association between the user and the management target device. The "Air Tag character string" of the Air Tag information for the tag ID "0001" shows this user ("Sato") is a user currently using the management target device (the power strip device 210a ("TAP210a")).

Then, after updating the Air Tag information in this manner, upon acceptance of the Air Tag information transmission request from the mobile terminal 70, the management server 50 transmits the Air Tag information of a person around the mobile terminal 70 to the mobile terminal 70 in return in response to this transmission request (Steps S15 and S16).

Figure 23:
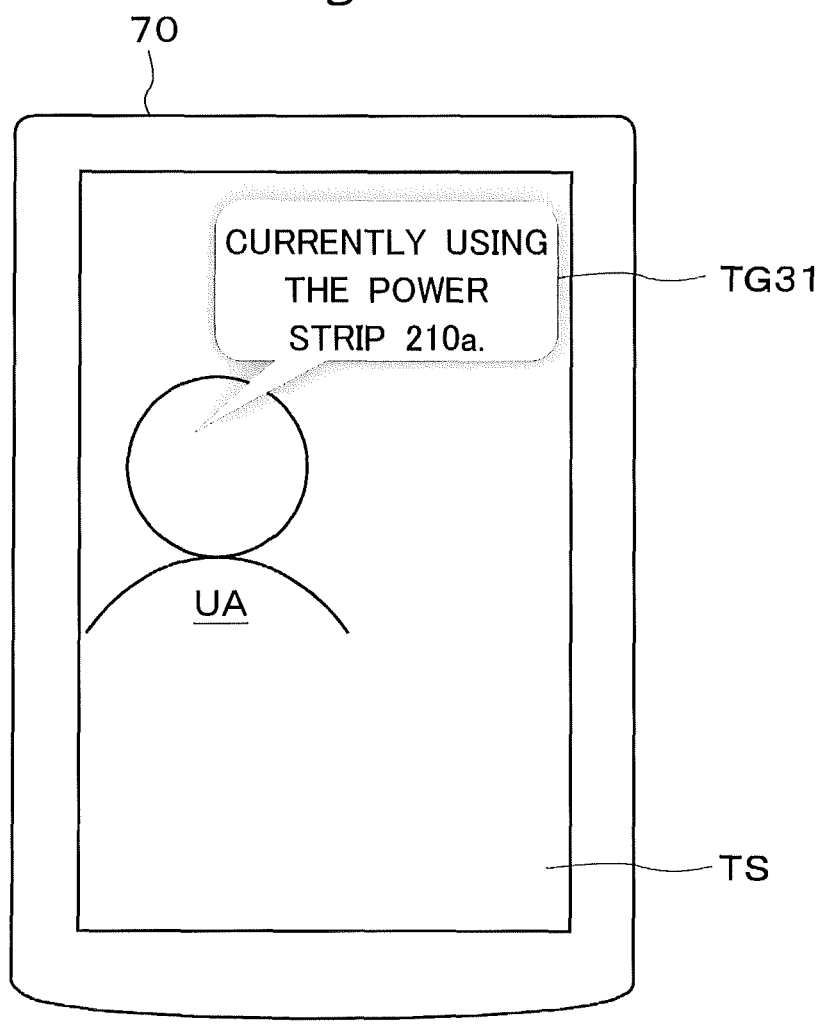
FIG. 23 illustrates a display example of an Air Tag according to the third embodiment.

As a result, an Air Tag TG31 as shown in FIG. 23 is displayed in the display unit 76b of the mobile terminal 70. For example, the character string "Currently using the power strip device 210a" and such are displayed by being superposed over a portion of a user UA ("Sato") in the shot image. In this manner, based on the Air Tag information for the user UA, the mobile terminal 70 displays the Air Tag image visualizing the "device-relating information" of the user UA in the display unit 76b by superposing the Air Tag image over the portion representing the user UA in the shot image of scenery around the mobile terminal 70.

By looking at such a superposed image, the operator (operator) of the mobile terminal 70 is able to recognize the user currently using the power strip device 210a, even if the operating user does not know the person UA (especially when the operating user does not know the face of the person UA). Therefore, it is possible to give a caution to the user (user using the power strip device 210a) who is being connected to the power strip device 210a more easily, before performing the disconnection operation of the power strip device 210a from a relatively higher order of the network, for example.

4. Modifications and the Like

The embodiments of the present invention have been described above, but the present invention is not limited to the examples described above.

For example, according to the second and third embodiments, the Air Tag for the user currently using the management target device is displayed in the mobile terminal 70. However, the Air Tag for the "administrating user" of the management target device may be displayed in the mobile terminal 70.

Further, modifications similar to the above modified examples of the first embodiment can be applied to the second and third embodiments.

Moreover, while according to the above embodiments, information of a user relating to a single certain device (for example, one of the image-forming devices 10a) is displayed as an Air Tag, the present invention is not limited to such an example. For example, the plurality of image-forming devices 10 may be selected as management target devices for which Air Tags are to be displayed in a setting screen of FIG. 24, and the information of the user(s) (an administrating user and/or a user in use) relating to the selected plurality of image-forming devices 10 may be displayed as Air Tags.

Furthermore, while according to the above embodiments, a management target device for which an Air Tag is to be displayed is selected in response to the user operation using the setting screen of FIG. 24, the present invention is not limited to such an example. For example, the management server 50 (or the mobile terminal 70) may determine (automatically) a management target device (such as the image-forming device 10) closest to the mobile terminal 70 to be a management target device for which an Air Tag is to be displayed.

Moreover, according to the above embodiments, the Air Tag information for all of the users near the mobile terminal 70 is transmitted from the management server 50 to the mobile terminal 70. In this case, the mobile terminal 70 may select (perform filtering for) only the Air Tag information for a desired management target device, and display the selected the Air Tag information.

Alternatively, only the Air Tag information relating to the device selected as a management target device for which an Air Tag is to be displayed may be transmitted to the mobile terminal 70.

Further, while according to the above embodiments, the position of each user is acquired by the GPS unit within the position detecting device 30, the present invention is not limited to such an example. For example, an RFID system including an RFID (Radio Frequency Identification) unit carried by each user and a plurality of base stations (RFID readers) that are positioned at fixed locations may be used to detect a position of each RFID unit (in turn, the position of each user).

While the invention has been shown and described in detail, the foregoing description is in all aspects illustrative and not restrictive. It is therefore understood that numerous modifications and variations can be devised without departing from the scope of the invention.

What is claimed is:

1. A management system for managing a management target device, the system comprising:
    the management target device;
    a position detection unit configured to detect a position of a user of the management target device;
    a management server configured to manage Air Tag information relating to the user; and
    a mobile terminal configured to receive the Air Tag information relating to the user from the management server, wherein
    the management server includes:
        a positional information acquisition unit configured to acquire positional information for the position of the user based on a result of the detection by the position detection unit;
        a generation unit configured to generate the Air Tag information including device-relating information and the positional information of the user, the device-relating information indicating an association between the user and the management target device; and
        a transmission unit configured to transmit the Air Tag information to the mobile terminal, and
    the mobile terminal displays, based on the Air Tag information of the user, an Air Tag image visualizing the device-relating information of the user in a display unit of the mobile terminal by superposing the Air Tag image over a portion representing the user within a shot image of scenery around the mobile terminal.

2. The management system according to claim 1, wherein the management target device is an image-forming device.

3. A management server for managing a management target device, the server comprising:
    a positional information acquisition unit configured to acquire positional information for a position of a user of the management target device;
    a generation unit configured to generate Air Tag information including device-relating information and the positional information of the user, the device-relating information indicating an association between the user and the management target device; and
    a transmission unit configured to transmit, to a mobile terminal, the Air Tag information relating to the user, the Air Tag information being for displaying an Air Tag in a display unit of the mobile terminal, and to cause an Air Tag image visualizing the device-relating information of the user to be displayed by being superposed over a portion representing the user within a shot image of scenery around the mobile terminal.

4. The management server according to claim 3, wherein the device-relating information indicates that the user is an administrating user of the management target device.

5. The management server according to claim 3, wherein the device-relating information indicates that the user is a user currently using the management target device.

6. The management server according to claim 3, wherein the Air Tag information includes specification information for specifying a display mode of the Air Tag image, and the generation unit alters the specification information according to a status change of the management target device, thereby causing the display mode of the Air Tag image to be altered.

7. The management server according to claim 6, wherein the generation unit alters whether or not to display the Air Tag image according to the status change of the management target device.

8. The management server according to claim 6, wherein the generation unit alters a display color of the Air Tag image according to the status change of the management target device.

9. The management server according to claim 6, wherein the generation unit alters the specification information according to the status change of the management target device from a normal state to an abnormal state, thereby causing the display mode of the Air Tag image to be altered.

10. The management server according to claim 6, wherein the generation unit alters the specification information according to the status change of the management target device from a state in which the device is unused by the user to a state in which the device is used by the user, thereby causing the display mode of the Air Tag image to be altered.

11. The management server according to claim 3, wherein the Air Tag information includes specification information for specifying a character string to be displayed for the Air Tag image, and
the generation unit alters the specification information according to a status change of the management target device, thereby causing the character string to be altered.

12. The management server according to claim 11, wherein the generation unit alters the specification information according to the status change of the management target device from a normal state to an abnormal state, thereby causing the character string to be altered.

13. The management server according to claim 11, wherein the generation unit alters the specification information according to the status change of the management target device from a state in which the device is unused by the user to a state in which the device is used by the user, thereby causing the character string to be altered.

14. A non-transitory computer-readable recording medium storing a program for causing a computer to execute the steps of:

(a) acquiring positional information for a position of a user of a management target device;

(b) generating Air Tag information including device-relating 5 information and the positional information of the user, the device-relating information indicating an association between the user and the management target device; and (c) transmitting, to a mobile terminal, the Air Tag information relating to the user, the Air Tag information being for displaying an Air Tag in a display unit of the mobile terminal, thereby causing an Air Tag image visualizing the device-relating information of the user to be displayed by being superposed over a portion representing the user within a shot image of scenery around the mobile terminal.

* * * * *